Patented Sept. 8, 1942

2,295,116

UNITED STATES PATENT OFFICE 2,295,116

PROCESS FOR THE PRODUCTION OF A COOKED AND PUFFED RICE PRODUCT

John L. Kellogg, Jr., deceased, late of Chicago, Ill., by Mary M. Kellogg, administratrix, Wilmette, Ill., assignor, by mesne assignments, to Helen L. Kellogg, Chicago, Ill.

No Drawing. Application February 6, 1939, Serial No. 254,800

5 Claims. (Cl. 99—82)

This invention relates to the production of cooked and puffed rice and the objects of the invention are to provide an improved ready-to-eat cereal product made from rice and a novel and improved process for making such product.

In particular the product is expanded in a manner whereby the cells are much enlarged, in comparison with ordinary puffed rice, giving the product a crisper and more full bodied character. It is less pithy than ordinary puffed rice.

The product is essentially a cooked product whereas the ordinary puffed rice is essentially a raw product; the puffing operation involving such a brief contact between the steam and the grain that little or no cooking effect is produced.

The rice may be treated, in accordance with the present invention, as described in the following specific examples which, however, are to be regarded as typical and informative merely and not as limiting the invention to the particular operating data given.

Example 1

(a) 50 pounds of white rice is cooked with 1½ gallons of water for 40 minutes at 13 pounds steam pressure in the ordinary rotary pressure cooker.

(b) The rice is removed from the cooker and dried to 29%–30% moisture.

(c) The partially dried material is then treated so as to effect a modification of the internal structure of the grain involving displacement apparently of the starch cells. This may be done by passing the grain between the usual flaking rolls but with the rolls set apart so that the grain is given a pressure slightly deforming it but without rolling the kernels out into flakes as is done, for example, in the production of flakes from rice or other cereals. Or the rice may be shot or hurled at high velocity against a steel plate. Or it will be possible to pack the grain in sacks and drop it from a high altitude. In any case the rice is subjected to impact pressure or jarring which brings about a slippage or displacement as between the starch cells which becomes possible through the cooking operation and which makes the rice particularly susceptible to the gun puffing operation which is to follow.

(d) The partially dried and pressure or impact treated rice is then allowed to temper for about 40 hours, in order to bring about uniformity of moisture content. This step is optional.

(e) The rice is then puffed in a puffing gun at the usual pressure. The gun may be of any suitable and usual construction. It may be externally heated; or it may be internally heated by high temperature steam; or both expedients may be used. The usual steam pressure of 200 pounds per square inch may be developed before the gun is opened and the material discharged in its puffed condition.

Example 2

(a) 100 pounds of white rice is cooked with 4 gallons of water at 15 to 25 pounds steam pressure per square inch in a rotary pressure cooker for from 40 to 80 minutes, preferably about 55 minutes, until all of the water has been absorbed and the rice thoroughly softened.

(b) After cooking, the rice is dried down to a moisture content at which the kernels will not adhere one to another, preferably, to a moisture content of 30%–40%.

(c) The dried rice grains are then subjected to pressure, impact or other mechanically applied force, of such character as to bring about the desired changes in the internal structure of the grain. Apparently this operation breaks down the cell walls, probably weakened by the cooking step. The result may be accomplished, as stated in Example 1, by dropping the cooked material upon a hard, flat surface from a height of 60 to 80 feet; or by shooting or hurling the grain against a hard surface at a corresponding velocity; or the rice may be passed between flaking rolls, preferably, however, set apart wider than in the case of ordinary flaking operations. It is not necessary, ordinarily to permanently deform the kernels, and the grains should not be rolled out into flakes.

(d) The material is then dried by any suitable means to a moisture content of from 9% to 15%, preferably 12%; and is preferably, although not necessarily, tempered for a period of 12 to 30 hours, preferably 24 hours, to insure relatively uniform distribution of moisture throughout the material.

(e) The material is then introduced into an airtight puffing apparatus or gun which consists of a rotatable cylinder permanently closed at one end and having an airtight cover at the other end, provided with means for heating the cylinder so as to create an internal steam pressure by vaporization of moisture in the grain. Water or steam may be introduced into the gun if desired. The gun, after being filled to about one-third capacity, is rotated and heated until there is developed an internal pressure of from 150 to 225 pounds per square inch. The heat is applied gradually so that the desired pressure is reached in from 5 to 15 minutes; the best results being obtained, according to experience, if the temperature is controlled so that the pressure of 200 pounds is reached in approximately 7 minutes, and this pressure is then held for 2 minutes thereafter. The cover of the gun is then suddenly removed, and as a result of the sudden reduction of the pressure in the gun, the cooked rice grains undergo an explosive expansion or puffing. The moisture content of the puffed material as it comes from the gun will be ordinarily between 5% and 8%, usually about 6%. If flavoring material had not been added in the first stage, or in the cooking stage, the material may be flavored with salt, sugar or other flavoring material after it has been puffed.

(f) The puffed material is preferably dried to a moisture content of 3%–4% in order to increase its crispness and keeping qualities. In case the puffed material is flavored, it is preferable to substitute for the drying step a toasting operation which also reduces the water content of the material to the desired point.

The term "explosively puffing," as used herein, is intended to mean the sort of instantaneous puffing accomplished, for example, by the gun method, as above described, or other method giving an explosive action due to sudden reduction of the high pressure surrounding the rice kernels in contra-distinction to the comparative or gradual and relatively small expansion which takes place when the grain particles are subjected to heat in an oven at atmospheric pressure.

The term "mechanical pressure" used to described the step following the cooking or partial drying step is intended to cover impact, jarring, or other similar application of mechanical force, as well as the pressure exerted by the flaking rolls.

This application is a continuation in part of application of John L. Kellogg, Jr., Serial No. 127,672, filed February 25, 1937, for "Puffed cereal product and process of making same," (patented January 13, 1942, as No. 2,269,536).

What is claimed is:

1. Process for the production of a cooked and puffed rice product which comprises cooking the rice for about 40 minutes at a steam pressure of 13 pounds per square inch with water in the proportion of 1½ gallons to 50 pounds of rice; drying the cooked rice to 29%–30% moisture; subjecting the cooked and dried rice to mechanical pressure to modify the internal structure of the grain but insufficient to reduce the same to a flake-like condition; and explosively puffing the grain.

2. Process for the production of a cooked and puffed rice product which comprises cooking the rice for about 40 minutes at a steam pressure of 13 pounds per square inch with water in the proportion of 1½ gallons to 50 pounds of rice; drying the cooked rice to 29%–30% moisture; subjecting the cooked and dried rice to mechanical pressure to modify the internal structure of the grain but insufficient to reduce the same to a flake-like condition; allowing the material to temper so as to equalize moisture content; and explosively puffing the grain.

3. Process of producing a cooked and puffed rice product which comprises: cooking the rice with water; subjecting the cooked material to mechanical pressure which modifies the internal structure of the grain without reducing it to a flaked condition; drying the rice to a water content suitable for explosive puffing; and thereafter explosively puffing the material.

4. Process of producing a cooked and puffed rice product which comprises: cooking the rice in water; partially drying the material; subjecting the material to mechanical pressure to alter the internal structure of the grain without reducing it to a flaked condition; drying the material to a suitable water content for explosive puffing and thereafter explosively puffing the rice.

5. Process of producing a cooked and puffed rice product which comprises: cooking the rice with water in the proportions of 4 gallons of water to 100 pounds of rice at a steam pressure of 15 to 25 pounds per square inch for from 40 to 80 minutes; drying the rice to a moisture content of 30%–40%; subjecting the partially dried rice grains to mechanical pressure to alter the internal structure of the grain without reducing it to a flaked condition; drying the material to a moisture content of from 9% to 15%; and thereafter explosively puffing the material.

MARY M. KELLOGG,
*Administratrix of the Estate of John L. Kellogg, Jr., Deceased.*